United States Patent [19]

Shimada et al.

[11] Patent Number: 4,897,434

[45] Date of Patent: Jan. 30, 1990

[54] AQUEOUS COATING RESIN COMPOSITIONS AND PROCESS FOR PRODUCING SAME

[75] Inventors: Hiroaki Shimada, Ageo; Yoshio Itoh, Urawa; Tadami Ueno, Ageo; Norio Yokomichi, Washinomiya, all of Japan

[73] Assignee: Dainippon Ink and Chemicals, Inc., Tokyo, Japan

[21] Appl. No.: 222,925

[22] Filed: Jul. 22, 1988

[30] Foreign Application Priority Data

Jul. 24, 1987 [JP] Japan ................. 62-184788

[51] Int. Cl.$^4$ ................. C08K 3/20
[52] U.S. Cl. ................. 523/409; 523/411; 523/412
[58] Field of Search ................. 523/411, 412, 409

[56] References Cited

U.S. PATENT DOCUMENTS 4,446,258  5/1984  Chu et al. ................. 523/412
4,446,260  5/1984  Woods et al. ................. 523/412

FOREIGN PATENT DOCUMENTS 3006175   8/1981  Fed. Rep. of Germany ...... 523/412
61-250023 11/1986  Japan ................. 523/412

*Primary Examiner*—Lewis T. Jacobs
*Attorney, Agent, or Firm*—Sherman and Shalloway

[57] ABSTRACT

An aqueous coating resin composition, the improvement wherein a microgel composed of a resin reaction product having a three-dimensional network structure, which is obtained by the esterification reaction of (1) 40 to 90 parts by weight of an aromatic epoxy resin with (2) 10 to 60 parts by weight of a carboxyl group-containing vinyl polymer comprising (a) a carboxyl group-containing vinyl monomer, (b) an aromatic vinyl monomer and (c) at least one monomer selected from the group consisting of an alkyl ester, a hydroxyalkyl ester and an N-hydroxyalkylamide of an alpha,beta-ethylenically unsaturated carboxylic acid, is dispersed into an aqueous medium; and a process for production thereof.

21 Claims, No Drawings

AQUEOUS COATING RESIN COMPOSITIONS AND PROCESS FOR PRODUCING SAME

This invention relates to an aqueous coating resin composition and a process for producing same. More specifically, this invention relates to an aqueous coating resin composition that can form an excellent coated film when used as a metal coating, especially as an interior can coating.

Can coatings or corrosion-resistant coatings have been so far required to be aqueous from the aspects of saving of resources, energy saving, environmental pollution, etc. Like solvent-type coatings, epoxy resin coatings have been mainly studied as aqueous coatings, and various methods have been proposed to disperse epoxy resins into water.

For instance, there are two methods wherein epoxy resins are dispersed into water using surface active agents, i.e. a method using an anionic surface active agent and a method using a nonionic surface active agent. However, in the former method, as an oxirane ring is opened during the emulsification and storage, the curability of the resin decreases and the performance of the resulting coated film is poor. Moreover, thickening and gelling tend to occur at times during storage. In the latter method, since a considerable amount of a surface active agent used to impart dispersibility and storage stability is contained in a system, it tends to have an adverse effect on chemical and mechanical properties of the coated film.

To solve these problems, there have been proposed various methods wherein self-emulsifiable epoxy resins obtained by modifying epoxy resins with acrylic resins and introducing emulsifiable segments into molecules are dispersed into water.

For example, U.S. Pat. No. 4,212,781 discloses a method wherein a grafted epoxy resin formed by polymerizing a monomer mixture containing a carboxyl group-containing vinyl monomer in the presence of an epoxy resin using a free radical initiator such as benzoyl peroxide is stably dispersed in an aqueous medium containing a base. Japanese Laid-open Patent Application Nos. 14,963/1978 and 9,433/1980 involve a method wherein a reaction product containing a higher proportion of carboxyl groups and obtained by partially reacting an acrylic resin with a relatively high-molecular-weight aromatic epoxy resin is stably dispersed in an aqueous medium in the presence of ammonia or amines. U.S. Pat. No. 4,480,058 and U.S. Pat. No. 4,482,673 include a method wherein a nongelled hydroxy ester copolymer composition substantially free of oxirane functionality, which is obtained by esterifying a carboxyl group-containing vinyl polymer with an epoxy resin in the presence of amine catalyst for esterification, is neutralized with a base and dispersed into water. U.S. Pat. No. 4,477,610 and Japanese Laid-open Patent Application No. 198,513/1983 involve a method wherein a compound having epoxy groups and acryloyl groups in a molecule and obtained by partially reacting an aromatic epoxy resin with (meth)acrylic acid is copolymerized with a monomer mixture containing acrylic or methacrylic acid, and the copolymer is neutralized with a base and dispersed into water. U.S. Pat. No. 4,458,040 and Japanese Laid-open Patent Application No. 109,243/1981 discloses a method wherein a reaction product obtained by partially reacting an aromatic epoxy resin with an alkali-neutralized acrylic resin is dispersed into an aqueous medium.

The self-emulsifiable epoxy resin compositions obtained by the above techniques give excellent coated films because they are free from the surface active agent for dispersing the epoxy resin into water.

These compositions are, when used as an interior can coating, usually blended with amino resins or phenolic resins having good curability. For example, suitable amounts of amino resins or phenolic resins improve a curing rate and increase a crosslinking density without decreasing properties of the resulting coated film, making it possible to provide a desirable hardness of the coated film. When these compositions are however used as an interior can coating, low-molecular-weight compounds derived from not only amino resins or phenolic resins but also epoxy resins or acrylic resins as a main component are dissolved in the contents of the can from the coated film by heat sterilization treatment.

These compositions require high-temperature baking, and the coated films have to be completely cured to prevent the low-molecular-weight compounds from being dissolved in the contents of the can. Accordingly, a large amount of energy is required to bake the coated films, and baking is slowed down.

It is an object of this invention to provide an aqueous coating resin composition of excellent dispersion stability with time which, when used as a metal coating, especially, as an interior can coating, enables formation of an excellent coated film that little allows low-molecular-weight compounds to be dissolved from the coated film to the contents of the can and therefore has excellent food sanitation and flavor preservation, under baking conditions of low temperatures and a short period of time.

This invention is to provide an aqueous coating resin composition (hereinafter called a "coating composition of this invention") that can achieve the above object, characterized in that a microgel composed of a resin reaction product having a three-dimensional network structure, which is obtained by the esterification reaction of (1) 40 to 90 parts by weight of an aromatic epoxy resin with (2) 10 to 60 parts by weight of a carboxyl group-containing vinyl polymer comprising (a) a carboxyl group-containing vinyl monomer, (b) an aromatic vinyl monomer and (c) at least one monomer selected from the group consisting of an alkyl ester, a hydroxyalkyl ester and an N-hydroxyalkylamide of an alpha,beta-ethylenically unsaturated carboxylic acid, is dispersed into an aqueous medium.

The coating composition of this invention can be produced, for example, by a process comprising a first step of esterifying (1) 40 to 90 parts by weight of an aromatic epoxy resin with (2) 10 to 60 parts by weight of a carboxyl group-containing vinyl polymer obtained by copolymerizing (a) a carboxyl group-containing vinyl monomer, (b) an aromatic vinyl monomer and (c) at least one monomer selected from the group consisting of an alkyl ester, a hydroxyalkyl ester and an N-hydroxyalkylamide of an alpha,beta-ethylenically unsaturated carboxylic acid in an alcoholic medium in such reactive group concentration that a proportion of carboxyl groups is higher than that of epoxy groups to form a non-gelled resin reaction product; a second step of neutralizing at least part of the carboxyl groups contained in the resin reaction product with a basic compound and then finely dispersing the neutralized product into water wherein the basic compound is used in such amount that pH of the dispersion reaches 5 or more; and a third step of reacting in the dispersion the epoxy and carboxyl groups remaining in the dispersed resin contained in the dispersion to form the resin dispersion into a microgel.

Examples of the aromatic epoxy resin used in this invention are a bisphenol A-type epoxy resin, a bisphenol F-type epoxy resin, a novolak-type epoxy resin, an aliphatic acid-modified epoxy resin and a phenolic compound-modified epoxy resin. Of these aromatic epoxy resins, preferable are those containing on the average 1.1 to 2.0 epoxy groups in one molecule and having a number-average molecular weight of 800 or more, most preferably 1,400 or more. Examples of commercial products are "Epikote 152", "Epikote 154", "Epikote 1004", "Epikote 1007", "Epikote 1009" & "Epikote 1010" made by Yuka Shell Epoxy K. K., and "Epiclon 1050", "Epiclon 4050" & "Epiclon 7050" made by Dainippon Ink & Chemicals, Inc. One or more types can be selectively used from the above aromatic epoxy resins. It is necessary that the aromatic epoxy resin used in this invention has epoxy groups and a molecular weight sufficient to gel when the esterification reaction with the carboxyl group-containing vinyl polymer is fully advanced in an alcohol medium in the presence of a catalyst for esterification.

The carboxyl group-containing vinyl polymer used in this invention is composed of (a) a carboxyl group-containing vinyl monomer, (b) an aromatic vinyl monomer and (c) at least one monomer selected from the group consisting of an alkyl ester, a hydroxyalkyl ester and an N-hydroxyalkylamide of an alpha,beta-ethylenically unsaturated carboxylic acid, and can be formed, for example, by copolymerizing these monomers at a temperature of 60° to 150° C. in an organic solvent using a common free radical initiator such as azobisisobutyronitrile or benzoyl peroxide.

(a) Examples of the carboxyl group-containing vinyl monomer include acrylic acid, methacrylic acid, crotonic acid, itaconic acid, maleic acid and fumaric acid.

(b) Examples of the aromatic vinyl monomer include styrene monomers such as styrene, vinyltoluene, 2-methylstyrene, t-butylstyrene and chlorostyrene.

(c) Examples of the alkyl ester of the alpha,beta-ethylenically unsaturated carboxylic acid include acrylic esters such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, n-octyl acrylate, decyl acrylate and dodecyl acrylate; and methacrylic esters such as methyl methacrylate, propyl methacrylate, n-butyl methacrylate, isobutyl methacrylate, n-amyl methacrylate, n-hexyl methacrylate, n-octyl methacrylate, 2-ethylhexyl methacrylate, decyl methacrylate and dodecyl methacrylate.

(d) Examples of the hydroxyalkyl ester of the alpha, beta-ethylenically unsaturated carboxylic acid include hydroxyethyl acrylate, hydroxypropyl acrylate, hydroxyethyl methacrylate and hydroxypropyl methacrylate.

(e) Examples of the N-hydroxyalkylamide of the alpha, beta-ethylenically unsaturated carboxylic acid include N-substituted (meth)acrylic monomers such as N-methylol(meth)acrylamide and N-butoxymethyl(meth)acrylamide.

A preferable monomer composition for forming a carboxyl group-containing vinyl polymer is such that a glass transition temperature (hereinafter called "Tg") of the resulting carboxyl group-containing vinyl polymer reaches 80° C. or lower. In order that coalescence between particles easily occurs when coating the coating composition of this invention, Tg of the carboxyl group-containing vinyl polymer is preferably 80° C. or lower. Where Tg of the carboxyl group-containing vinyl polymer is higher than 80° C., film-formability of the coating tends to decrease when the coating composition is coated.

The amount of the carboxyl group-containing vinyl monomer is preferably 20 to 60% by weight based on the total weight of the monomers for obtaining the carboxyl group-containing vinyl polymer. Where the amount is less than 20% by weight, there is a tendency that dispersion stability of resins in an aqueous medium, adhesion to a metal of a coated film, solvent resistance and flavor preservation when the coating composition is used as an interior can coating become poor. Where the amount is more than 60% by weight, viscosity of a reaction system tends to go extremely high in copolymerizing the monomers to obtain the carboxyl group-containing vinyl polymer. Consequently, production becomes difficult, as well as water resistance of the coated film and resistance to boiling when the coating composition is used as an interior can coating decrease.

It is necessary that the carboxyl group-containing vinyl polymer has a molecular weight sufficient to gel when the esterification reaction with the aromatic epoxy resin thoroughly proceeds in the alcoholic solvent in the presence of the catalyst for esterification. It has usually a weight-average molecular weight of 5,000 to 100,000. Where the weight-average molecular weight is lower than 5,000, the microgelled coating composition is not obtained at times in the third step. Where it is higher than 100,000, a coating composition having excellent properties of a coated film is obtained when the reaction with the aromatic epoxy resin advances until good self-emulsifiability is shown, but a solids content has to be extremely lowered for obtaining a coating composition of a desired viscosity; it is thus impractical.

A weight ratio of the aromatic epoxy resin to the carboxyl group-containing vinyl polymer used in the first step is preferably 40:60 to 90:10. When the proportion of the aromatic epoxy resin is less than 40% by weight, the microgelled coating composition is not obtained at times in the third step. When the proportion of the aromatic epoxy resin is more than 90% by weight, the content of the carboxyl group-containing vinyl monomer in the carboxyl group-containing vinyl polymer has to be increased for stably dispersing the microgel obtained in the third step in the aqueous medium; consequently, film-formability of the coating tends to become poor.

Examples of the alcoholic medium used in the first step include alcohols having 2 to 6 carbon atoms, such as ethanol, n-propanol, isopropanol, n-butanol, sec-butanol, isobutanol, tert-butanol, amyl alcohol, isoamyl alcohol, sec-amyl alcohol, n-hexanol and cyclohexanol, glycol ethers such as methyl cellosolve, ethyl cellosolve, propyl cellosolve, butyl cellosolve, methyl carbitol and ethyl carbitol, glycol ether acetates such as methyl cellosolve acetate and ethyl cellosolve acetate, dioxane, dimethylformamide and diacetone alcohol. n-Butanol is most preferable because it can easily be removed from the aqueous medium.

The reaction in the first step is carried out with stirring at 50 to 100° C. for 10 minutes to 4 hours in the presence of a tertiary amine such as dimethylaminoethanol. Said reaction is run to such extent that the non-gelled resin reaction product has self-emulsifiability. Usually, 20 to 80%, preferably 30 to 70% of the epoxy groups may be reacted. The progress of the reaction can be traced by measuring increase in viscosity of the reaction system and decrease in acid value. Where the reaction ratio of the epoxy groups is less than 20%, self-emulsifiability is poor. Where it exceeds 80%, viscosity of the reaction liquid is too high, making hard the production in the subsequent steps and increasing a risk of gelation.

The non-gelled resin reaction product obtained in the first step has an acid value of 30 to 100, preferably, 40 to 80. When the acid value is lower than 30, the particle size of the dispersed resin in the resulting dispersion obtained in the second step becomes large, with a result that dispersion stability of the dispersed resin or microgel in the subsequent steps tends to decrease. When the acid value is higher than 100, low-molecular-weight compounds are dissolved from the coated film to the contents of the can and boiled water resistance becomes poor.

The non-gelled resin reaction product containing a higher proportion of carboxyl groups which is obtained in the first step can be dispersed into water by neutralizing it with a basic compound in such amount that pH of the dispersion becomes 5 or more in the subsequent second step. The thus obtained resin dispersion has an average particle size of 0.01 to 1.0 μm, most preferably 0.05 to 0.5 μm.

The basic compound used here is preferably ammonia or volatile amines; inorganic bases are undesirable because they are liable to remain in the coated film, reducing water resistance.

Examples of the amines include alkylamines such as trimethylamine, triethylamine and butylamine; alcoholamines such as dimethylaminoethanol, diethanolamine and aminomethylpropanol; and morpholine. Polyamines such as ethylenediamine and diethylenetriamine are also available.

The aqueous medium in this invention is water or a mixture of at least 10% by weight of water and a hydrophilic organic solvent. Examples of the hydrophilic organic solvent include alkyl alcohols such as methanol, ethanol, n-propanol, isopropanol, n-butanol, sec-butanol, tert-butanol and isobutanol, glycol ethers such as methyl cellosolve, ethyl cellosolve, propyl cellosolve, butyl cellosolve, hexyl cellosolve, methyl carbitol and ethyl carbitol, glycol ether esters such as methyl cellosolve acetate and ethyl cellosolve acetate, dioxane, dimethylformamide and diacetone alcohol.

In the third step, the epoxy and carboxyl groups remaining in fine particles are reacted by heating the dispersed resin to form a microgel having a three-dimensional network structure. This reaction may also be run in the dispersed resin containing the alcoholic solvent used in the first step or after removing the alcohol medium used in the first step by distillation. Said reaction is usually carried out at 40° to 90° C. for 1 to 50 hours.

The dispersed resin obtained in the second step is a non-gelled resin soluble in ethers such as tetrahydrofuran and aprotic polar solvents such as N-methyl-2-pyrrolidone, dimethylformamide, dimethylacetamide and dimethylsulfoxide. When the reaction in the third step advances, this becomes a microgel of a three-dimensional network structre insoluble in the solvent.

The reactivity in the third step cannot be measured by a method of tracing a proportion of remaining epoxy groups because the reaction product becomes a microgel and goes insoluble in the solvent. However, the reactivity can be estimated by a method of tracing an acid value of a turbid aqueous medium. According to this method, consumption of carboxyl groups nearly corresponding to epoxy groups remaining in the reaction system is observed, and the acid value then becomes fixed. Although the reaction is performed in water containing an amine, the epoxy groups are consumed substantially completely by reacting them with the carboxyl groups.

The coating composition of this invention has very good dispersion stability. In case the organic solvent has to be reduced, a low-boiling solvent such as acetone or methyl ethyl ketone, or a solvent azeotropic with water, such as butanol or butyl cellosolve is used as a reaction solvent or a dispersion aid whereby the coating composition having the low content of the organic solvent can be obtained stably and easily by, after dispersion in the aqueous medium, distilling the solvent under normal pressure or reduced pressure.

The coating composition of this invention can optionally contain a solvent, a surface active agent or a defoamer for improving coatability. Moreover, it is also possible to add an amino resin or a phenolic resin as a curing agent to the coating composition of this invention. It is however undesirous to add a large amount of the curing agent because amounts of unreacted low-molecular-weight compounds remaining in the coated film are increased and amounts of said compounds dissolved from the coated film to the contents of the can are then increased. If the curing agent is added, the amount is 5% or less, preferably 3% or less.

Moreover, the coating composition of this invention can also be mixed with polyester resins, polybutadiene resins, their modified resins, a vinyl chloride/vinyl acetate copolymer resin or epoxy resins. These resins are not altogether required to be rendered aqueous. After the reaction in the first step, these resins may be mixed and dispersed into water, or after the reaction in the third step, these resins may be diluted with a suitable hydrophilic solvent and added to the water dispersion with stirring.

As the self-emulsifiable epoxy resin itself is rendered ultrahigh-molecular-weight to such extent that it contains a microgel, the coating composition of this invention has the following characteristics.

(1) Since unreacted low-molecular-weight epoxy resins or acrylic resins can be reduced, it is possible to remedy the problem of dissolving these resins from the coated film to the contents of the can.

(2) Since the curing agent such as an amino resin or a phenolic resin is not necessarily required, it is possible to remedy the problem of dissolving the unreacted low-molecular-weight compounds remaining in baking and curing from the coated film to the contents of the can.

(3) As the baking can be conducted at low temperatures for a short period of time, energy saving and improvement in productivity are possible.

(4) As the reaction advances in the dispersion, the coating composition has excellent dispersion stability with time.

From these characteristics, the coating composition of this invention is useful as a coating material of aluminum, tinplated steel sheet, pre-treated metals or steel. The coating composition of this invention is also available as a coating material of a non-metal substrate such as a timber. It is most preferably used as an interior can coating used in food and beverage. The coated film obtained by using the coating composition of this invention has water resistance, does not allow low-molecular-weight compounds to be dissolved from the coated film to the contents of the can, and has quite high non-permeability of the coated film, so that a natural taste or flavor of food and beverage stored inside the can is not changed.

Spray coating such as air spray, airless spray or electrodeposition spray is preferable. Dip coating, roll coater coating or electrodeposition coating is also available. The baking is conducted preferably at 120° to 250° C. for 10 seconds to 30 minutes.

The coating composition of this invention can be used also as a rust-proofing primer, a printing ink or a anticorrosive paint by optionally blending it with a rust-proofing agent, a pigment, a filler, etc.

The following Examples and Comparative Examples illustrate this invention. In the examples, "parts" and "%" are by weight.

EXAMPLE 1

Preparation of a carboxyl group-containing vinyl polymer solution

|  | parts |
| --- | --- |
| Styrene | 525 |
| Ethyl acrylate | 450 |
| Methacrylic acid | 525 |
| n-Butanol | 2,250 |
| Benzoyl peroxide | 30 |

A four-necked flask purged with a nitrogen gas was charged with ¼ of the mixture having the above formulation and heated at 90° C. While keeping that temperature, ¾ of the mixture was gradually added dropwise over the course of 2 hours. After the addition, the mixture was further stirred at that temperature for 2 hours. After the reaction was over, the reaction mixture was cooled to obtain a carboxyl group-containing vinyl polymer solution having an acid value of 230 (as a solids content; the same applies to the following), a solids content of 39.5% and a weight-average molecular weight of 36,000.

Preparation of an epoxy resin solution

|  | parts |
| --- | --- |
| Epikote 1007 | 163 |
| Ethylene glycol monobutyl ether | 137 |

A four-necked flask purged with a nitrogen gas was charged with the total weight of the above starting materials, and gradually heated to a reflux temperature. After the mixture was stirred for 1 hour and completely dissolved, it was cooled to 80° C. to obtain an epoxy resin solution having a solids content of 54%.

Preparation of an aqueous coating resin composition

|  |  | parts |
| --- | --- | --- |
| (1) | Said carboxyl group-containing vinyl polymer solution | 150 |
| (2) | Said epoxy resin solution | 260 |
| (3) | 2-Dimethylaminoethanol | 10 |

| | | parts |
| --- | --- | --- |
| (4) | 28% aqueous ammonia | 1 |
| (5) | Deionized water | 448 | first step

A four-necked flask purged with a nitrogen gas was charged with (1) and (2) and then heated to 60° C. Thereafter, (3) was added and the mixture was maintained for 2 hours. At this time, 40% of the epoxy groups was reacted, and an acid value of a non-gelled resin reaction product was 61.

second step

To the above reaction product were added (4) and (5) over the course of 10 minutes to obtain an opalescent water dispersion having a solids content of 23% and pH of 7.3.

third step

The above water dispersion was maintained at 70° C. and further stirred. Six hours later, a microgel insoluble in tetrahydrofuran was formed. An acid value of the turbid aqueous medium was measured and found to be 54. Thereafter, the microgel was increased, and the acid value was meanwhile decreased. After 10 hours, the acid value reached 50 and became constant. After the product was kept for 15 hours, it was cooled to obtain an aqueous coating resin composition containing the microgel.

EXAMPLES 2 to 4 and COMPARATIVE EXAMPLES 1 and 2

Using reaction systems shown in Table 1, various coating compositions were produced in the same way as in Example 1. The abbreviations indicated in Table 1 are as follows.

MAA . . . methacrylic acid
St . . . styrene
EA . . . ethyl acrylate
BA . . . n-butyl acrylate The reaction products obtained in the Examples and Comparative Examples are evaluated by the following methods.

Measurement of a reaction ratio of epoxy groups in the first step

The reaction ratio of the epoxy groups was estimated by dissolving the reaction product in the first step in tetrahydrofuran and measuring the acid value.

Preparation of a coated sheet for test

Each of various coating compositions obtained in Examples and Comparative Examples was coated to make 6 μm dry film on a 0.1 mm thick aluminum foil, and baked for 4 minutes in a oven set at temperatures shown in Table 1. The resulting coated product was taken out and cooled to room temperature to give a coated sheet for test.

Extraction test

The above coated sheet for test of 160 cm² was dipped in 100 ml of purified water, and boiled at 100° C. for 1 hour. An amount of potassium permangenese consumed was measured for said water and evaluated according to the following three grades.

○ ... less than 5 ppm
Δ ... less than 10 ppm
X ... 10 ppm or more

Flavor and taste test

A hard glass rod 5 mm in diameter was dipped in each of the various coating compositions obtained in Examples and Comparative Examples and withdrawn. After natural dropping disappeared, the rod was placed in a dryer held at various temperatures shown in Table 1 and baked for 4 minutes. The baked rod was withdrawn, cooled and put in a container filled with 100 ml of purified water per 100 m² of the area of the coated film to completely dip the coated film in purified water. The container was tightly closed, boiled for 30 minutes and cooled at 20° C. to prepare a test water.

A control water was prepared in the same manner as above except the glass rod was not dipped in the coating composition.

The flavor and taste of the test water were compared with those of the control water and evaluated according to the following three grades.

○ ... No substantial difference is observed.
Δ ... A doubtful difference is observed.
X ... A clear difference is observed.

TABLE 1

|  |  | Example 1 | Example 2 | Example 3 | Example 4 | Comparative Example 1 | Comparative Example 2 |
|---|---|---|---|---|---|---|---|
| Monomers for preparing a carboxyl group-containing vinyl polymer (parts) | MAA | 20.7 | 20.7 | 24.0 | 19.8 | 20.7 | 20.7 |
|  | St | 20.7 | 20.7 | 15.0 | 19.8 | 20.7 | 20.7 |
|  | EA | 17.9 | 17.9 | 20.3 | — | 17.9 | 17.9 |
|  | BA | — | — | — | 19.8 | — | — |
| Molecular weight of carboxyl group-containing vinyl polymer |  | 36,000 | 36,000 | 47,000 | 82,000 | 36,000 | 36,000 |
| Epoxy resin (parts) | Epikote 1007 | 141 | — | — | — | 141 | 141 |
|  | Epikote 1009 | — | 141 | — | 141 | — | — |
|  | Epikote 1010 | — | — | 200 | — | — | — |
| Proportion of epoxy groups in the first step |  | 40% | 67% | 53% | 48% | 40% | 83%(*) |
| Third step |  | Yes | Yes | Yes | Yes | No | — |
| Test item | Baking temperature |  |  |  |  |  |  |
| Dissolving test | 140° C. | ○ | ○ | ○ | ○ | Δ | — |
|  | 160° C. | ○ | ○ | ○ | ○ | ○ | — |
| Flavor test | 140° C. | ○ | ○ | ○ | ○ | Δ | — |
|  | 160° C. | ○ | ○ | ○ | ○ | ○ | — |

*In Comparative Example 2, gelatin occurred when the first step was over.

The component resin in the coating composition of this invention is rendered high-molecular-weight to such extent that it contains the microgel in the aqueous medium; accordingly, even if the coating composition is used as a metal coating, especially, as an interior can coating, it can form an excellent coated film that little allows low-molecular-weight compounds to be dissolved from the coated film to the contents of the can and is therefore excellent in food sanitation and flavor preservation, under baking conditions of low temperatures and a short period of time wherein a curing agent is not necessarily required. Moreover, the coating composition of this invention has excellent dispersion stability with time.

What we claim is:

1. In an aqueous coating resin composition, the improvement wherein a microgel composed of a resin reaction product having a three-dimensional network structure, which is obtained by the esterification reaction of (1) 40 to 90 parts by weight of an aromatic epoxy resin with (2) 10 to 60 parts by weight of a carboxyl group-containing vinyl polymer having a weight-average molecular weight of 5,000 to 100,000 comprising (a) a carboxyl group-containing vinyl monomer, (b) an aromatic vinyl monomer and (c) at least one monomer selected from the group consisting of an alkyl ester, a hydroxyalkyl ester and an N-hydroxyalkylamide of an alpha,beta-ethylenically unsaturated carboxylic acid, is dispersed into an aqueous medium.

2. The aqueous coating resin composition of claim 1 wherein the aromatic epoxy resin is a bisphenol A epoxy resin, a bisphenol F epoxy resin, an aliphatic acid-modified epoxy resin or a phenolic compound-modified epoxy resin.

3. The aqueous coating resin composition of claim 1 wherein the aromatic epoxy resin has on the average 1.1 to 2.0 epoxy groups in one molecule and a number-average molecular weight of 800 or more.

4. The aqueous coating resin composition of claim 1 wherein the carboxyl group-containing vinyl monomer is selected from the group consisting of acrylic acid, methacrylic acid, crotonic acid, itaconic acid, maleic acid and fumalic acid.

5. The aqueous coating resin composition of claim 1 wherein the amount of the carboxyl group-containing vinyl monomer is 20 to 60% by weight based on the total weight of the monomers for obtaining the carboxyl group-containing vinyl polymer.

6. The aqueous coating resin composition of claim 1 wherein the aromatic vinyl monomer is selected from the group consisting of styrene, vinyltoluene, 2-methylstyrene, t-butylstyrene and chlorostyrene.

7. The aqueous coating resin composition of claim 1 wherein the carboxyl group-containing vinyl polymer has a glass transition temperature of 80° C. or lower and a weight-average molecular weight of 5,000 to 100,000.

8. The aqueous coating resin composition of claim 1 wherein the aqueous medium is water or a mixture of at least 10% by weight of water and a hydrophilic organic solvent.

9. A process for producing an aqueous coating resin composition which comprises a first step of esterifying (1) 40 to 90 parts by weight of an aromatic epoxy resin with (2) 10 to 60 parts by weight of a carboxyl group-containing vinyl polymer having a weight-average molecular weight of 5,000 to 100,000 obtained by copolymerizing (a) a carboxyl group-containing vinyl monomer, (b) an aromatic vinyl monomer and (c) at least one monomer selected from the group consisting of an alkyl ester, a hydroxyalkylester and an N-hydroxyalkylamide of an alpha,beta-ethylenically unsaturated carboxylic acid in an alcoholic medium in such reactive group concentration that a proportion of carboxyl groups is higher than that of epoxy groups to form a non-gelled resin reaction product having an acid value of 30 to 100; a second step of neutralizing at least part of the carboxyl groups contained in the resin reaction product with a basic compound and then finely dispersing the neutralized product into water wherein the basic compound is used in such amount that pH reaches 5 or more; and a third step of reacting in the dispersion the epoxy and carboxyl groups remaining in the dispersed resin contained in the dispersion to form the resin dispersion into a microgel.

10. The process of claim 9 wherein the aromatic epoxy resin is a bisphenol A epoxy resin, a bisphenol F epoxy resin, an aliphatic acid-modified epoxy resin or a phenolic compound-modified epoxy resin.

11. The process of claim 9 wherein the aromatic epoxy resin has on the average 1.1 to 2.0 epoxy groups in one molecule and a number-average molecular weight of 800 or more.

12. The process of claim 9 wherein the carboxyl group-containing vinyl monomer is selected from the group consisting of acrylic acid, methacrylic acid, crotonic acid, itaconic acid, maleic acid and fumalic acid.

13. The process of claim 9 wherein the amount of the carboxyl group-containing vinyl monomer is 20 to 60% by weight based on the total weight of the monomers for obtaining the carboxyl group-containing vinyl polymer.

14. The process of claim 9 wherein the aromatic vinyl monomer is selected from the group consisting of styrene, vinyltoluene, 2-methylstyrene, t-butylstyrene and chlorostyrene.

15. The process of claim 9 wherein the carboxyl group- containing vinyl polymer has a glass transition temperature of 80° C. or lower and a weight-average molecular weight of 5,000 to 100,000.

16. The process of claim 9 wherein the esterification reaction in the first step is carried out in the presence of a tertiary amine.

17. The process of claim 9 wherein the reaction ratio of the epoxy groups in the first step is 20 to 80%.

18. The process of claim 9 wherein the acid value of the non-gelled resin reaction product is 40 to 80.

19. The process of claim 9 wherein the average particle size of the dispersed resin is 0.01 to 1.0 μm.

20. The process of claim 9 wherein the basic compound is ammonia or a volatile amine.

21. A printing ink composed of the aqueous coating resin composition of claim 1.

* * * * *